United States Patent [19]
Woythal et al.

[11] 4,400,859
[45] Aug. 30, 1983

[54] MACHINING CENTERS FOR MACHINING TUBULAR WORKPIECES

[75] Inventors: Robert T. Woythal, West Allis; Philip J. Finet, Milwaukee, both of Wis.

[73] Assignee: Kearney & Trecker Corporation, West Allis, Wis.

[21] Appl. No.: 219,529

[22] Filed: Dec. 23, 1980

[51] Int. Cl.[3] .............................................. B23Q 1/14
[52] U.S. Cl. ..................................... 29/27 C; 82/1.2; 409/143; 409/165; 409/215
[58] Field of Search .............. 409/165, 215, 143, 166, 409/167, 168, 199; 279/1 R; 29/561, 27 R, 27 C, 33 T; 414/749; 82/1.2, 1.3, 1.4, 1.5, 20, 45, 101, 102; 408/71

[56] References Cited

U.S. PATENT DOCUMENTS

| | | | |
|---|---|---|---|
| 1,181,113 | 5/1916 | Conradson | 409/215 X |
| 1,737,002 | 11/1929 | De Vlieg | 409/168 |
| 2,049,394 | 7/1936 | Johnson | 409/219 |
| 2,128,625 | 8/1938 | Vaughn | 409/167 |
| 2,619,879 | 12/1952 | Hosea | 409/215 X |
| 2,620,710 | 12/1952 | Gallimore et al. | 409/215 |
| 2,771,798 | 11/1956 | De Vlieg | 82/1.2 |
| 2,781,887 | 4/1957 | Johnson et al. | 82/20 X |
| 2,975,701 | 3/1961 | Munschaver | 414/749 |
| 3,037,429 | 6/1962 | Schurger | 409/215 |
| 3,038,734 | 6/1962 | Else | 279/1 R |
| 3,407,704 | 10/1968 | Reeber et al. | 409/215 X |
| 3,788,170 | 1/1974 | Riedel | 82/20 |
| 4,141,279 | 2/1979 | Abel et al. | 409/165 X |

FOREIGN PATENT DOCUMENTS

| | | | |
|---|---|---|---|
| 743061 | 5/1970 | Belgium | 409/143 |
| 637498 | 3/1962 | Canada | 408/71 |
| 55-83525 | 6/1980 | Japan | 82/1.2 |

OTHER PUBLICATIONS

"Giant Stub Borer Cuts Machining Time" Tooling & Production, Nov., 1974, pp. 80 & 81.

*Primary Examiner*—William R. Briggs
*Attorney, Agent, or Firm*—Quarles & Brady

[57] ABSTRACT

A machining center for machining the interior of an elongate tubular workpiece includes a bed on which a rotatably indexable member is slidably mounted for movement on the bed along a first axis. Removably fastened on the indexable member in spaced parallelism are a first and second hollow bore spindles each engaging the exterior surface of a tubular workpiece whose interior is to be machined. The first spindle is rotatably driven to rotate the tubular workpiece about its axis responsive to machine tool control system commands slidably mounted on the bed for movement thereon along a path perpendicular to the path of member movement in an upright. Extending from the upright parallel to the axis of upright movement for insertion into the workpiece bore is an arm which is movable along the upright along a vertical direction. At the distal end of the arm is a right angle, high speed rotary driven cutting tool carrying spindle. By manipulating rotational movement of the tubular workpiece and by manipulating the translational movement of the arm, the upright and the bed, interior machining of the workpiece can easily be facilitated.

4 Claims, 8 Drawing Figures

MACHINING CENTERS FOR MACHINING TUBULAR WORKPIECES

BACKGROUND OF THE INVENTION

This invention relates generally to numerically controlled machine tools and, more specifically, to a numerically controlled machine tool which is specifically adapted to rapidly machine the interior surface of an elongate tubular workpiece.

Performing machining operations such as drilling milling or profiling on the interior surfaces of an elongate tubular workpiece, such as a torpedo casing, incurs certain difficulties not otherwise incurred in machining the interior surfaces of short tubular workpieces. For example, conventional numerically controlled machine tools, such as horizontal and vertical spindle machining centers and vertical turret lathes, although well suited for machining the interior surfaces of short tubular workpieces, usually are incapable of machining the interior surfaces of elongate tubular workpieces because such machine tools have a limited tool reach. In certain instances where the length of the elongate tubular workpiece, whose interior surfaces are to be machined, is less than twice the tool reach of such machine tools, it may be possible to machine the entire interior surface of the workpiece on such conventional machine tools by repositioning the workpiece after one-half of the interior workpiece surface is machined. However, repositioning the workpiece greatly increases the chances of positioning errors.

To overcome these difficulties, special machines have been constructed to facilitate interior machining of elongate tubular workpieces. An example of such a special machine is the giant stub boring machine described in the November 1974 issue of *Tooling and Production* which comprises a bed on which a table is slidably mounted for movement thereon along a first axis. Fastened to the table is a tubular workpiece, typically a steam turbine casting, whose central axis is perpendicular to the axis of table movement. A machine tool spindlehead is slidably mounted on the bed for movement thereon along a path perpendicular to the path of table movement and carries an elongate spindle which extends therefrom into the workpiece bore, the spindle being movable on the spindlehead along an axis perpendicular to the axes of table and spindlehead movement. A numerical control system simultaneously regulates spindle speed, table movement, spindle movement and spindlehead movement to effectuate interior machining of the workpiece.

While the above-described stub boring machine is well suited for interior machining of elongate tubular workpieces, it is subject to the disadvantage that the workpiece does not rotate relative to the machine table and thus, to complete a machining operation about the interior circumference of the workpiece bore, the spindle and table are moved under command of the machine tool control system to effectively rotate the spindle about the circumference of the interior workpiece bore. Unfortunately, since the metal chips cut during machining operations tend to accumulate at the bottom-most portion of the workpiece bore, the cutting tool at the end of the spindle will, when machining the bottom-most portion of the workpiece interior, be re-cutting these chips as it engages the interior workpiece surface thereby decreasing machine efficiency.

In contrast, the present invention concerns a machine center, especially adapted for interior machining of elongate tubular workpieces, which includes apparatus for rotating the tubular workpiece relative to the cutting tool so that the cutting tool never engages the bottom-most portion of the workpiece interior, thus avoiding re-cutting of the chips disseminated during prior machining operations.

It is an object of the present invention to provide a machining center especially adapted for machining the interior of elongate tubular workpieces.

It is another object of the present invention to provide a machining center, especially adapted to machine the interior elongate tubular workpieces, which rotates the workpiece relative to the cutting tool so that the cutting tool never engages the bottom-most part of the workpiece, thus avoiding re-cutting of chips disseminated during previous machining operations.

BRIEF SUMMARY OF THE INVENTION

Briefly, in accordance with the preferred embodiment of the invention, a machining center, especially adapted for machining the interior surfaces of an elongate tubular workpiece, comprises a bed on which an upright is slidably mounted for movement on the bed along a first axis. Slidably mounted on the bed for movement thereon along a second axis, perpendicular to the first axis, is a table overlying which is a member which is rotatably indexable relative to the table. A pair of rotatable, hollow bore spindles are removably fastened to the indexable member in spaced parallelism for engaging opposite ends of the elongate tubular workpiece. One of the spindles is rotatably driven through a worm wheel-worm gear arrangement by a motor under control of the machine tool control system to rotate the workpiece about its central axis. Extending from the upright parallel to the axis of upright movement for insertion into the bore of the tubular workpiece is an arm which is movable on the upright along a vertical axis perpendicular to each of the first and second axes. A high speed, right angle rotary driven, cutting tool-carrying spindle is indexably journaled to the arm at its distal end within the workpiece bore for engaging the cutting tool carried in the spindle into engagement with the interior workpiece surface. By indexably positioning the spindle so the cutting tool held in the spindle is never facing vertically downwards, and by controlling the rotation of the workpiece and translational movement of the table, the upright and the arm, machining of the tubular elongate workpiece interior surfaces is easily facilitated while avoiding re-cutting of previously cut chips accumulated at the bottom of the workpiece.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
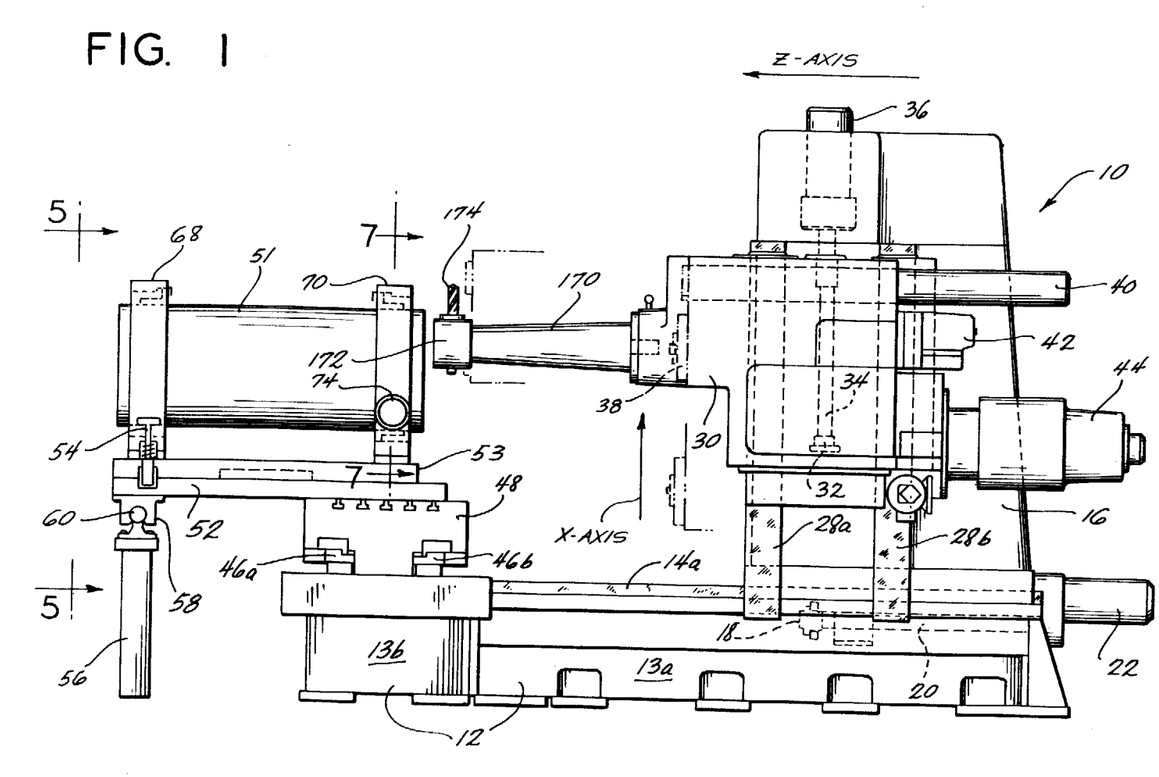
FIG. 1 is a front view of the machining center of the present invention.
Figure 2:
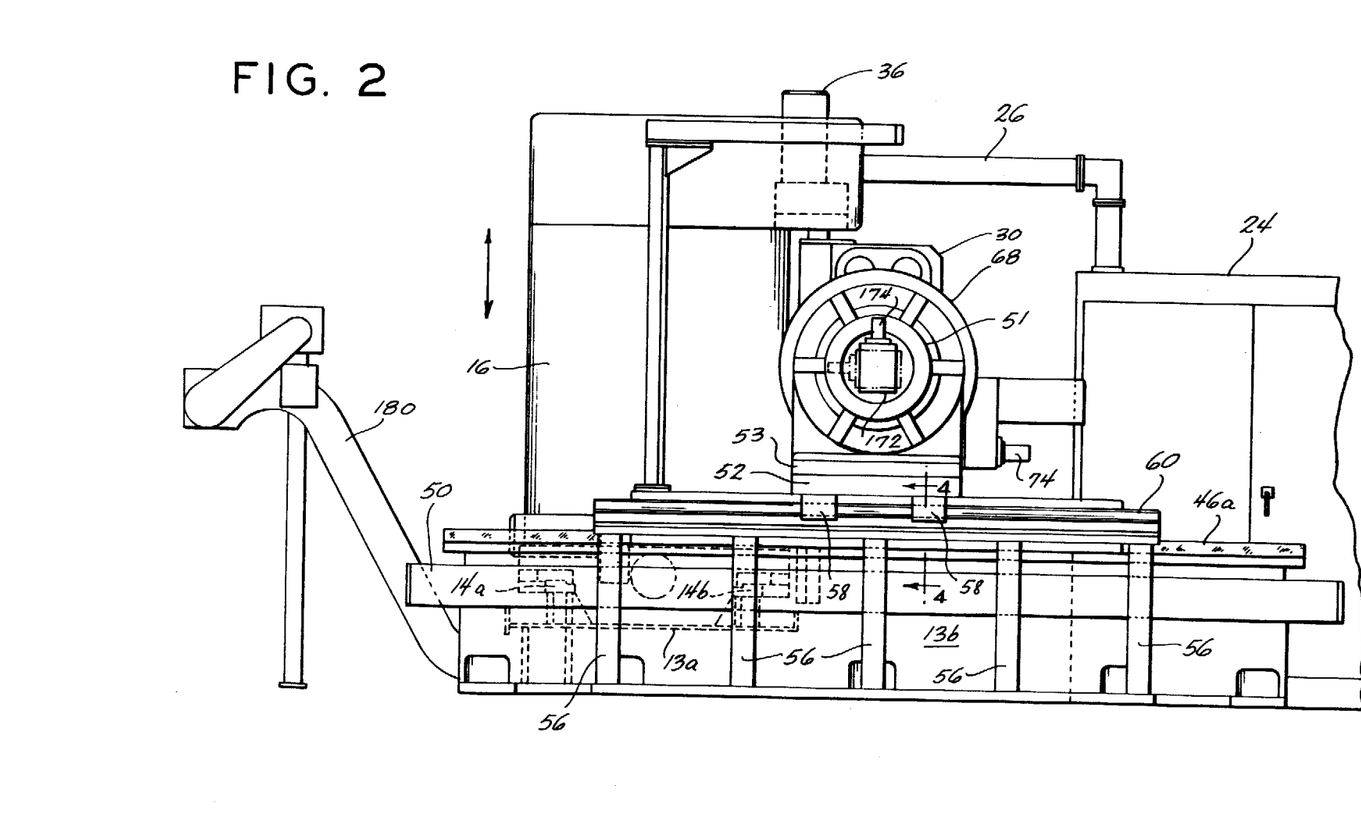
FIG. 2 is a side view of the machining center of FIG. 1.
Figure 3:
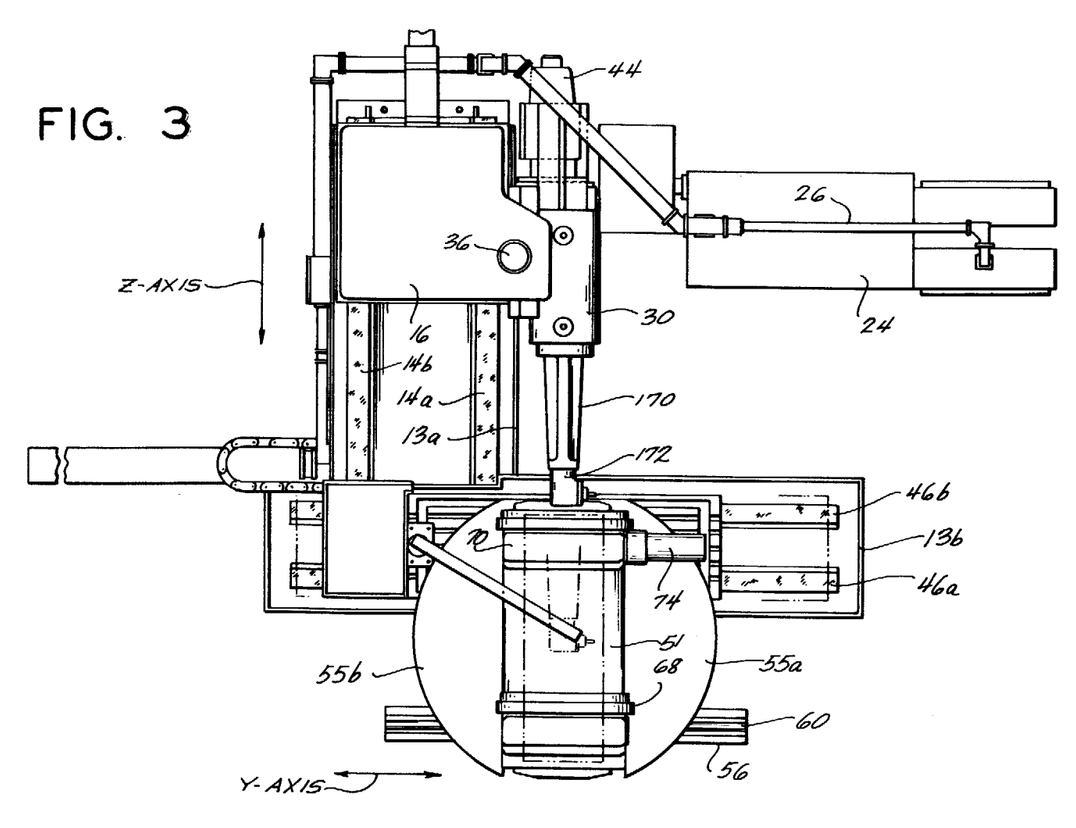
FIG. 3 is a plan view of the machining center of FIG. 1.

FIGS. 1, 2 and 3 illustrate the front, side and plan views, respectively, of an improved machining center 10 which is comprised of a base or bed 12 configured of a pair of perpendicular cross bed members 13a and 13b, fastened on cross bed member 13a are a pair of ways 14a and 14b (FIGS. 2 and 3) in spaced parallelism. A column or upright 16 is slidably supported on ways 14a and 14b by bearings (not shown) for movement on the ways along a first or Z axis. Attached to cross bed member 13a is a ball nut 18 (FIG. 1) which threadedly engages a ball screw 20 rotatably journaled in upright 16. Ball screw 20 is driven by a motor 22 which is controlled by a machine tool control system 24 (FIGS. 2 and 3), the machine tool control system typically being comprised of a Kearney & Trecker Model D-17 machine tool control system. Motor 22 is connected to machine tool control system 24 by electrical conductors carried in a cable trough 26 (FIGS. 2 and 3). By regulating the excitation of motor 22, machine tool control system 24 controls the movement of upright 16 on bed 12 along the Z axis.

On the front face of upright 16 there are mounted a pair of vertically extending ways 28a and 28b (FIG. 1) in spaced parallelism. A machine head, designated as spindlehead 30 (FIGS. 1 and 3) is slidably fastened on ways 28a and 28b by bearings (not shown) for movement on the ways along a second or X axis which is perpendicular to the Z axis. Fastened within spindlehead 30 is a ball nut 32 (FIG. 1) which threadedly engages a ball screw 34 (FIG. 1) vertically journaled in the upright for rotation about the X axis. Ball screw 34 is rotatably driven by a motor 36 under the control of machine tool control system 24, which, by regulating the excitation of motor 36, controls the movement of spindlehead 30 along the X axis.

Spindlehead 30 has a cutting tool carrying spindle 38 (FIG. 1) rotatably journaled therein parallel to the Z axis and has a pair of overarms 40 (FIG. 1) (only one of which is shown in FIG. 1) journaled therein parallel to the spindle for supporting large milling heads when the same are engaged in the spindle. Spindle 38 is conventional in construction and includes a draw bar (not shown) coaxially seated in the spindle. The draw bar is rotatably driven by a draw bar driver motor 42 (FIG. 1) fastened to the spindlehead opposite to spindle 38, to thread the draw bar into, or out from the cutting tool carried in the spindle to engage and disengage, respectively, the cutting tool in the spindle. Fastened to spindlehead 12 adjacent to draw bar driver motor is a spindle driver motor 44 (FIGS. 1 and 3) which is coupled to the spindle through a gear train (not shown) disposed in the spindlehead for rotatably driving spindle 38. Spindle driver motor 44 coupled to and controlled by machine tool control system 24 while draw bar drive motor 42 is controlled manually.

A pair of ways 46a and 46b are fastened on cross bed member 13b in spaced parallelism along a third or Y axis (FIGS. 2 and 3) so as to be perpendicular to, but lie in the same plane as ways 14a and 14b. A table 48 is slidably mounted on ways 46a and 46b by bearings or the like (not shown) for movement along the Y axis. Attached to cross bed member 13b is a ball nut (not shown) which is in threaded engagement with a ball screw (not shown) journaled to the undersurface of table 48. The ball screw is rotatably driven by a motor 50 (FIG. 2) under the command of machine tool control system 24. By regulating the excitation of motor 50, machine tool control system 24 regulates the movement of table 48 along the Y axis.

So far, the elements described above comprise a conventional, fixed bed, horizontal spindle milling machine, such as a DATA MILL 700 horizontal spindle milling machine manufactured by Kearney & Trecker Corporation. As will be seen below, the above-described horizontal spindle fixed bed milling machine is easily adapted to machine the interior of elongate workpieces with only minor modifications, thus allowing for added flexibility. However, as will also become more clearly understood hereinafter, elements 38, 42 and 44 described above, which comprised some of the elements of machining center 10 which allows it to operate as a fixed bed horizontal spindle milling machines, are not utilized when machining center 10 is employed to machine the interior surfaces of an elongate tubular workpiece and thus, if machining center 10 is to be utilized strictly for the interior machining of elongate tubular workpieces, then these elements could be deleted to effect a considerable cost saving.

To facilitate machining of the interior of an elongate tubular workpiece, such as tubular workpiece 51, a plate 52 (FIGS. 1 and 2), typically rectangular in shape, is fastened to and overlies table 48 so as to extend therebeyond (FIG. 1). A second plate 53 is indexably journaled to plate 52 for 180° rotation about an axis parallel to the X axis. A spring loaded pin 54 is disposed through plates 52 and 53 to lock the plates together, thus preventing rotation of plate 53 relative to plate 52. A pair of semi-circular guards 55a and 55b are fastened to a separate one of the sides of plate 53 as illustrated in FIG. 3 to prevent objects, particularly human appendages, from being scissored between plates 52 and 53.

Figure 4:
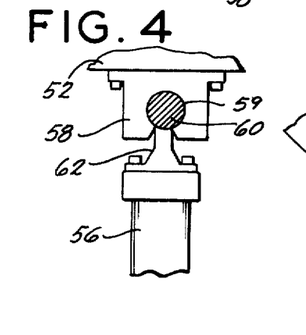
FIG. 4 is a cross-sectional view of the machining center of FIG. 1 taken along lines 4—4.

Plate 52 is supported along its path of travel by a support fence 56 comprised of a plurality of vertically extending members (FIG. 1) each located a predetermined distance from bed 12 so as to be in spaced parallelism with the axis of travel of table 46 (FIG. 3). The details of how plate 52 is supported by fence 56 are illustrated in FIG. 4. Fastened to the undersurface of plate 52 directly above fence 56 are a pair of bushing blocks 58. Referring now to FIG. 4 which is a cross-sectional view of a portion of FIG. 2 taken along lines 4—4, each bushing block 58 has an appearture 59 centrally disposed therethrough so as to lie in the same vertical plane as support fence 56. The apperture 59 in each bushing block is dimensioned to receive a highly polished rail 60 which extends along the top of fence 56 and is supported therefrom by a rail carrier 62. Thus, as plate 52 moves jointly with table 48, bushing blocks 58 slide along rail 59 so that distal end of plate 52 is continuously supported by fence 56.

Referring back to FIGS. 1-3, removably fastened on plate 53 in spaced parallelism are a pair of hollow bore spindles 68 and 70 for engaging the exterior surface of workpiece 51 at or near its ends. Spindles 68 and 70 each engage the exterior surfaces of workpiece 51 in an identical manner. The only difference between spindles 68 and 70 is that spindle 70 includes a motor 74 under command of machine tool control system 24 for rotating workpiece 51 about its central axis whereas spindle 68 does not include such a motor. Since spindles 68 and 70 each engage the workpiece in an identical manner, only the details of the workpiece engaging mechanism of spindle 68 will be described in detail.

Figure 5:
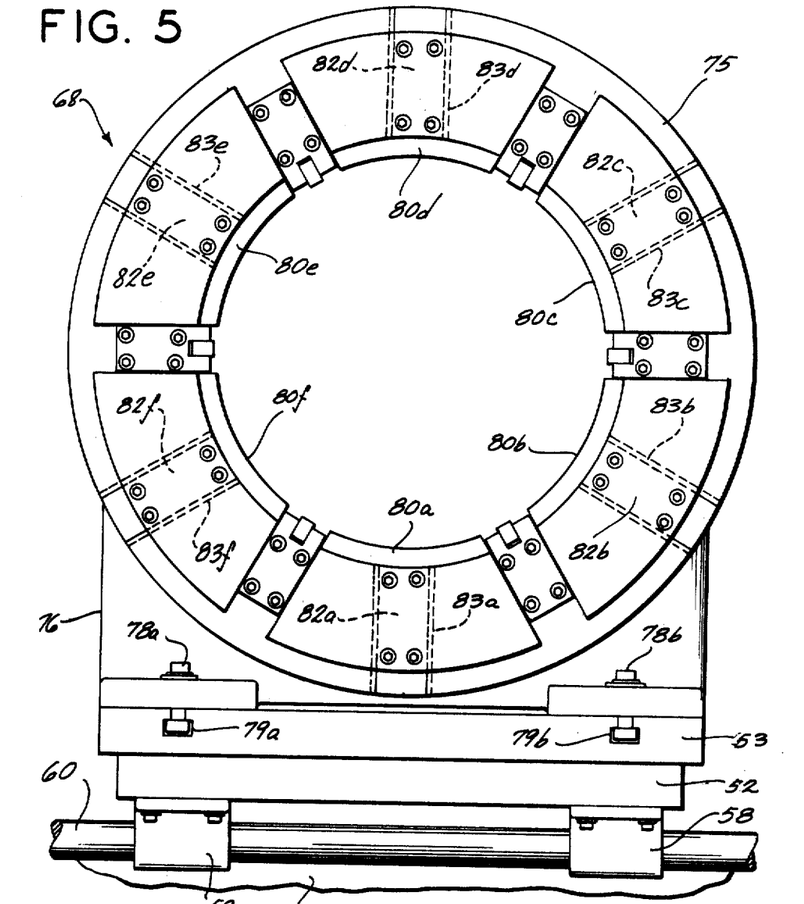
FIG. 5 is a cross-sectional view of that portion of the machining center of FIG. 1 taken along lines 5—5.

Referring now to FIG. 5, there is shown a cross-sectional view of spindle 68 taken along lines 5—5 of FIG. 1. As illustrated, spindle 68 comprises a hollow bore chuck 75 which is rotatably journaled in a frame 76, frame 76 being fastened to plate 53 by bolts 78a and 78b whose heads are retained in a separate one of a pair of T slots 79a and 79b, respectively, inscribed in plate 53 perpendicular to rail 60. By loosening bolts 78a and 78b, spindle 68 can be moved along plate 53 parallel to spindle 70 (FIGS. 1 and 3) to accomodate different length pieces. Situated equidistantly about the interior bore of chuck 75 are 6 arcuate jaws 80a–80f, each one of jaws 80a–18f having a separate one of keys 82a–82f, respectively, fastened thereto so as to extend radially therefrom into a separate one of channels 83a–83f, respectively, in chuck 75. Interposed between each adjacent pair of chuck jaws is a separate one of rollers 84a–84f, respectively, which facilitates loading and unloading of a tubular workpiece into the chuck.

Figure 6:
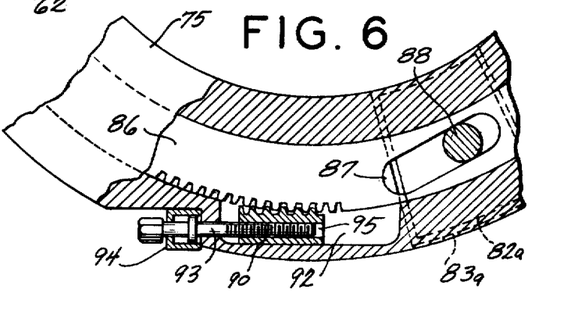
FIG. 6 is a cross-sectional view of that portion of the machining center of FIG. 5.

A better understanding of how each of keys 82a–82f moves radially in a separate one of slots 83a–83f, respectively, in chuck 75 to urge a corresponding one of jaws 80a–80f, respectively, against the exterior surface of a tubular workpiece disposed through the chuck bore may be gained by reference to FIG. 6 which is a cross-sectional view of a portion of the chuck of FIG. 5. Journaled coaxially in chuck 75 is a ring gear 86 which has six slots 87 cut therein (only one of which is illustrated). Each of slots 87 is angled relative to a line emenating from the chuck center and extending radially through the slot. Within each of slots 87 there is disposed a separate one of cam followers 88 (only one of which is illustrated). Each of cam followers 88 is perpendicularly threaded into a separate one of the chuck jaw keys, such as chuck jaw key 82a which is disposed in channel 83a in chuck 75. As gear 86 rotates coaxially within chuck 75, each of cam followers 88 rides along a separate one of slots 87 to advance or retract the chuck jaw key in a radial direction to move the corresponding chuck jaw radially inwardly or outwardly depending on whether gear 86 rotates in a counter clockwise or clockwise direction, respectively.

Rotation of ring gear 86 is facilitated by a toothed rack 90 which is slidably disposed in a recess 92 located in chuck 75 adjacent to ring gear 86 so that rack 90 meshingly engages gear 86. Rack 90 is slidably urged within recess 92 along an axis which is parallel to a line tangent to ring gear 86 at the point the ring gear meshingly engages rack 90, by a bolt 93, which is disposed through a flange 94 seated in niche in the exterior of chuck gear 75 so that bolt 93 threadedly engages a complementary threaded bore 95 disposed through the rack coaxial with the direction of rack movement.

Figures 7, 8:
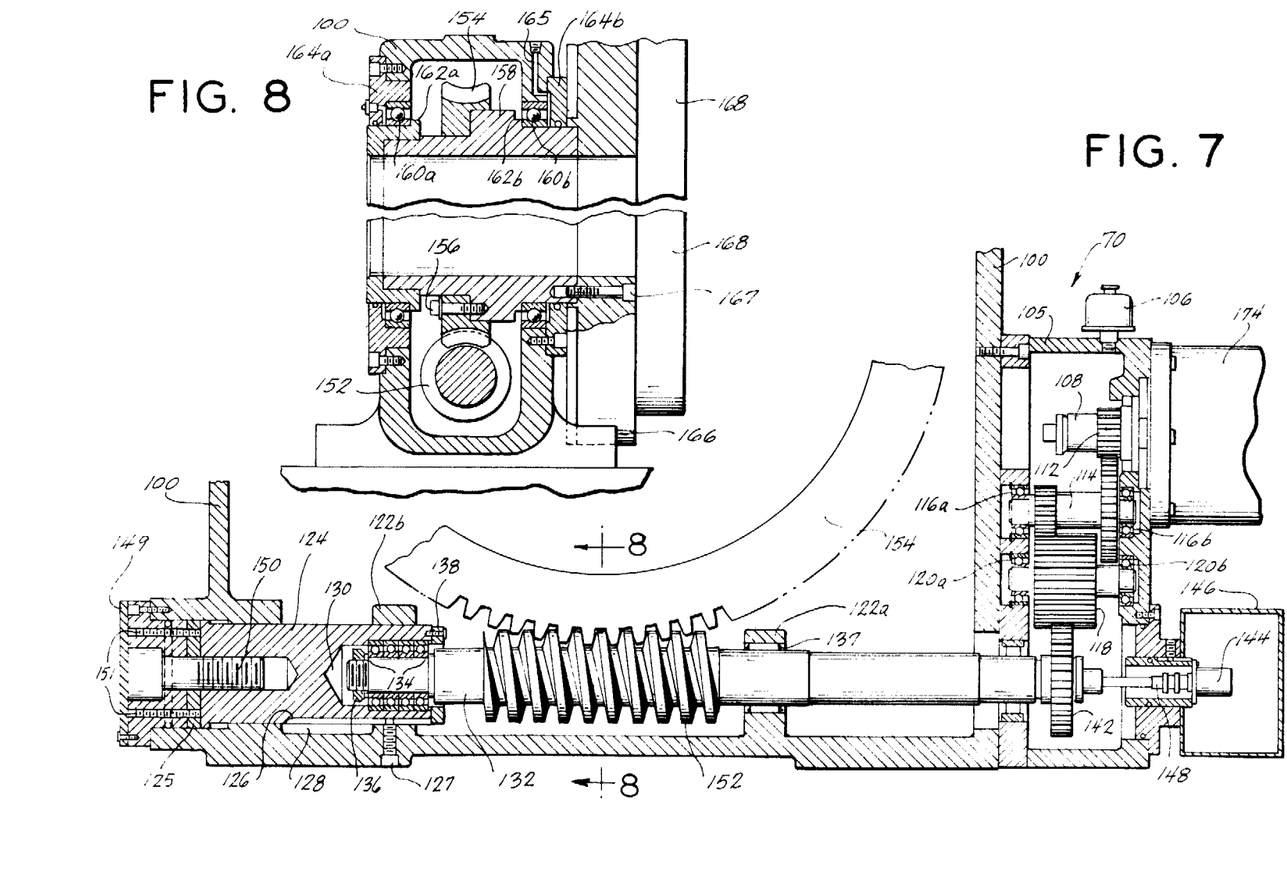
FIG. 7 is a cross-sectional view of a portion of the machining center of FIG. 1 taken along lines 7—7.
FIG. 8 is a cross-sectional view of that portion of the machining center of FIG. 7 taken along lines 8—8.

As previously indicated, spindle 70 is constructed practically identical to spindle 68 with the exception that spindle 70 is rotatably driven by a motor 74 whereas spindle 68 is not. The details of how spindle 70 is rotatably driven by motor 74 are depicted in FIG. 7 which is a cross-sectional view of spindle 70 taken along lines 7—7 of FIG. 1. Spindle 70 comprises a frame 100, one side of which is attached to a gear case 105 into which lubricating oil is admitted through oiler 106 disposed through the top of gear case 105. Motor 74 is fastened to gear case 105 opposite to spindle frame 100 so that the shaft 108 of motor 74 extends into the gear case perpendicular to the spindle frame. Keyed on motor shaft 108 is a pinion gear 112 which meshingly engages a cluster gear 114 journaled into gear case 105 parallel to shaft 108 by a pair of bearings 116a and 116b. Cluster gear 114 itself meshingly engages a pinion gear 118 journaled into gear case 105 parallel to pinion gear 112 and cluster gear 114 by a pair of bearings 120a and 120b.

Within the interior of spindle frame 100 there is located a pair of vertically extending walls 122a and 122b in spaced apart parallelism. A sleeve 124 is disposed through bore 125 the leftward side of spindle frame 100 so that its rightward most end is seated in a bore through wall 122b. Sleeve 124 carries a keyway 126 which extends longitudinally along the exterior sleeve surface a set screw 127 is threaded through the bottom of frame 100 so as to engage keyway 126 to prevent sleeve 124 from rotating but allowing sleeve 124 to move transversely along its axis.

In the rightward end of sleeve 124 there is a bore 130 into which the leftward most end of a shaft 132 is journaled by bearings 134 which are carried on the leftward most end of shaft 132 between a nut 136 and a bearing plate 138 having a bore therein dimensioned to receive shaft 132. Bearing plate 138 is fastened to the rightward end of sleeve 124 so as to overlie bore 130. Shaft 132 is journaled through wall 122a by bearings 137 and extends through the rightward side of spindle frame 100 into gear case 105. A roller bearing 137 seated in frame 100 journals the shaft to the rightward side of frame 100. The rightward most end of shaft 132 located within gear case 105 carries a pinion gear 142 which is in meshing engagement with pinion gear 118. Thus, when motor 74 is excited in response to a command from the machine tool control system, rotational energy is transmitted through gears 112, 114, 118 and 142 to shaft 132. To assure accurate angular positioning of shaft 132, a resolver 144, secured in a housing 146 which is fastened to gear case 105 parallel to motor 74, has its shaft 148 fastened to shaft 132 to generate an electrical signal indicative of shaft 132 angular position.

As will become apparent to those skilled in the art, shaft 132 will tend to shift axially during rotation unless otherwise restrained. To prevent shaft 132 from shifting axially during rotation, a cap or bushing 149 is fastened to the leftward end of spindle frame 100 to overlie the bore 125 therein. A cap screw 150 is disposed perpendicularly through bushing 149 to threadedly engage sleeve 124 to urge the sleeve leftwardly. Disposed through bushing 149 parallel to cap screw 150 are a plurality of set screws 151 which each bear against sleeve 124 to urge it rightwardly. Cap screw 150 and set screws 151 cooperate with bushing 149 to effectively restrain sleeve 124f from axial movement.

Located on that portion of shaft 132 situated between walls 122a and 122b is a worm gear 152 which is in meshing engagement with a perpendicular worm wheel 154 which drives the chuck of spindle 70 as may be better understood by reference to FIG. 8 which is a cut away view of spindle 70 taken along lines 8—8 of FIG. 7. Referring now to that figure, worm wheel 154, which is in meshing engagement with worm wheel 152, is fastened by bolts 156 (only one of which is shown) to a hub or sleeve 158 rotatably journaled in spindle frame 100 by a pair of bearings 160a and 160b which are carried adjacent to the rightward and leftward ends of hub 158, respectively, between a separate one of hub shoulders 162a and 162b and a separate one of bearing caps 164a and 164b, respectively, which are fastened to the rightward and leftward sides, respectively, of spindle frame 100 so as to overlie the bore through the spindle frame. A lubrication passage 165 is disposed through the spindle frame to conduct lubrication into bearing 160b. A similar lubrication passage (not shown) is disposed through the spindle frame to conduct lubrication to bearing 160a.

A chuck 166, configured identically to chuck 80 illustrated in FIG. 5, is fastened by bolts 167 (only one of which is shown) to hub 158. As with chuck 80 illustrated in FIG. 5, chuck 166 has 6 arcuate jaws 168 spaced equidistantly about its inner bore (only a pair of which are shown), each chuck jaw being keyed in a separate radially extending slot (not shown) in the chuck so as to be movable in a radial direction for engaging the outer surface of a tubular workpiece disposed through the spindle. Following engagement of chuck jaws 168 with the exterior tubular workpiece surface, the workpiece can than be rotated about its central axis energizing motor 74 (FIG. 7) to drive worm gear 152, thereby transmitting rotational energy to worm wheel 154 and hub 158 to chuck 166.

Referring back to FIGS. 1-3, an arm 170 is mounted on spindlehead 130 overlying spindle and overarm 40 and extends from spindlehead 30 parallel to the Z axis for insertion into the bore of workpiece 51 held in spindles 68 and 70. At the end of arm 170 distal from spindlehead 30, there is indexably journaled a high speed right angle rotary driven, tool-carrying spindle 172, such as manufactured by Byrant Corporation. Spindle 172 engages a cutting tool therein, such as an end mill 174, which, when brought into engagement with the interior surface of workpiece 51, performs the designated machining operation. As is best illustrated in FIG. 2, spindle 172 may be indexably positioned relative to X axis so that cutting tool 174 engaged in spindle 172 can be positioned to engage the upper most or rightward most side portions of the interior surfaces of workpiece 51. So long as spindle 172 and cutting tool 174 are not facing vertically downwards, then machining of the interior surfaces of workpiece 51 can easily be facilitated by controlling the rotation of workpiece 51 and the translational movement of the upright, the table, and the spindlehead while avoiding recutting of metal chips accumulated at the bottom most portion of the workpiece during previous machining operations.

As is illustrated in FIG. 2, a chip conveyor 180 is located adjacent to bed member 13a so that its belt extends beneath bed section 13b. Chip conveyor 180, although not necessary to the operating of machining center 10 either as a conventional horizontal spindle fixed bed milling machine or configured as described to machine the interior of elongate tubular workpieces, nevertheless serves a very useful purpose. Chip conveyor 180 transports chips that have fallen through the bed into a receptacle (not shown) thereby preventing chips from accumulating beneath the bed which could adversely affect machining center 10 operation.

The foregoing describes a horizontal spindle machining center which includes a pair of hollow bore spindles mounted in spaced parallelism on the machine tool table for securing a tubular workpiece therebetween and for rotating the workpiece responsive to machine tool control system commands. Extending perpendicularly from the spindlehead is an arm which carries a high speed right angle tool-carrying spindle at its distal end for insertion into the workpiece bore. Interior machining of the workpiece held in the spindles is readily facilitated by controlling the translational movement of the spindlehead, the upright and the table and by controlling the rotational movement of the workpiece.

Although the illustrative embodiment of the invention has been described in considerable detail for the purpose of fully disclosing a practical operative structure incorporated in the invention, it is to be understood that the particular apparatus shown and described is intended to be illustrative only and that various novel features of the invention may be incorporated in other structural forms without departing from the spirit and scope of the invention as defined in the subjoined claims.

The principles of this invention having now been fully explained in connection with the foregoing, we hereby claim as our invention:

1. A machine tool for machining the interior surfaces of workpieces comprising:
   a base;
   a member movably supported on said base for movement along two mutually transverse paths;
   an elongated arm extending forwardly from said movable member;
   a spindle head supported by the extending end of said arm;
   a cutter carrying spindle rotatably mounted in said spindle head with its axis disposed at an angle to the axis of said arm;
   power means connected to rotate said cutter for performing a work operation on a workpiece;
   a worktable movably supported on said base for movement along a path orthogonal to each of said two transverse paths of member movement;
   a first plate fastened to said worktable;
   a second plate overlying said first plate and being journaled on said first plate for rotation about an axis perpendicular to the axis of worktable movement;
   a pair of guards, each extending outwardly opposite from one of the edges of said second plate to prevent human appendages from being scissored between said first and second plates when said second plate is rotated relative to said first plate;
   a spring loaded pin disposed vertically through said first and second plates for releasably locking said first and second plates together to prevent rotation of said second plate relative to said first plate; and
   a first and second pair of spaced apart spindles rotatably mounted on said second plate for supporting the workpiece with its axis parallel to the axis of the arm to allow insertion of said spindle head into the workpiece so that said cutter can perform a work operation on the interior of the workpiece.

2. The invention according to claim 1 wherein said first spindle comprises:
   a frame removably fastened to said carrier;
   a hollow bore hub rotatably journaled in said frame;
   a hollow bore chuck fastened to said hub so that said bore of said chuck communicates with the bore of said hub;

a plurality of chuck jaws spaced equidistantly about the bore of said chuck, each chuck jaw being radially movable within said chuck for movement in a radial direction to engage the exterior surface of the tubular workpiece when the workpiece is disposed to the chuck bore; and means including a cylindrical ring rotatably journaled within said chuck and engaged with each of said chuck jaws for urging each of said chuck jaws radially inwardly.

3. The invention according to claim 2 further including means for supporting a portion of said first plate extending beyond said worktable, said means comprising:

a vertical fence underlying the portion of said first plate extending beyond said worktable and said fence extending along a line parallel to the path of worktable movement;

a rail fastened to the top of said fence; and at least one bushing block fastened to the undersurface of the portion of the first plate extending beyond said worktable for slidably receiving said rail so as to enable said plate to be supported from said fence as said worktable moves.

4. A machining center for machining the interior surfaces of an elongate tubular workpiece comprising:

a frame;

a carrier slidably mounted on said frame for movement thereon;

a support rotatably journaled to said carrier for rotation about an axis perpendicular to the axis of carrier movement;

a first hollow bore spindle removably fastened to said support for engaging a tubular workpiece inserted through said spindle;

a second spindle removably fastened to said support in spaced apart relationship with said first spindle and including a frame removably fastened to said support;

a chuck rotatably journaled in said frame;

a plurality of chuck jaws spaced equidistantly about the bore of said chuck for movement in a radial direction to engage the exterior surfaces of the tubular workpiece when the workpiece is inserted through the chuck bore;

a plurality of rollers each interposed between adjacent pair of chuck jaws and each extending into the bore of said chuck to facilitate movement of a tubular workpiece through the bore of said chuck;

means fastened to said first spindle for rotatably driving said first spindle to rotate the tubular workpiece inserted through said spindle;

an elongate arm carried on said frame for insertion into the bore of the elongate workpiece held in said first and second spindles; and a rotatably driven right angle cutting tool-carrying spindle located the distal end of said arm within the bore of said elongate workpiece for rotatably driving the cutting tool therein in a direction perpendicular to the direction of arm movement to facilitate machining of the interior surface of the workpiece inserted through said spindles.

* * * * *